United States Patent [19]

Kinnicutt, Jr. et al.

[11] 4,013,177

[45] Mar. 22, 1977

[54] COIL INVERTER

[75] Inventors: Roger Kinnicutt, Jr.; William J. Hill, both of Holden, Mass.

[73] Assignee: Morgan Construction Company, Worcester, Mass.

[22] Filed: June 2, 1975

[21] Appl. No.: 582,612

[52] U.S. Cl. .......................... 214/1 Q; 214/130 C; 214/DIG. 4; 242/79

[51] Int. Cl.² ...................................... B65G 7/00

[58] Field of Search .......... 214/1 Q, 130 R, 130 C, 214/147 G, DIG. 1, DIG. 4; 242/79

[56] References Cited

UNITED STATES PATENTS

| | | | |
|---|---|---|---|
| 2,596,477 | 5/1952 | Frischmann et al. | 214/DIG. 4 X |
| 2,984,364 | 5/1961 | Lamb | 214/1 Q |
| 3,071,258 | 1/1963 | Seigh et al. | 214/1 Q |
| 3,206,049 | 9/1965 | Laing et al. | 214/130 C |
| 3,286,854 | 11/1966 | Crawford | 214/1 Q |

*Primary Examiner*—Frank E. Werner
*Attorney, Agent, or Firm*—Thompson, Birch, Gauthier & Samuels

[57] ABSTRACT

An apparatus is disclosed for use in a rolling mill to invert upstanding cylindrical product coils in order to facilitate trimming and inspection of both ends of the coils. The apparatus includes a cradle into which a coil is laterally received. The coil is inverted by rotating the cradle about an axis transverse to the coil axis. Suitable holding devices on the cradle operate to prevent coil distortion during its inversion.

5 Claims, 21 Drawing Figures

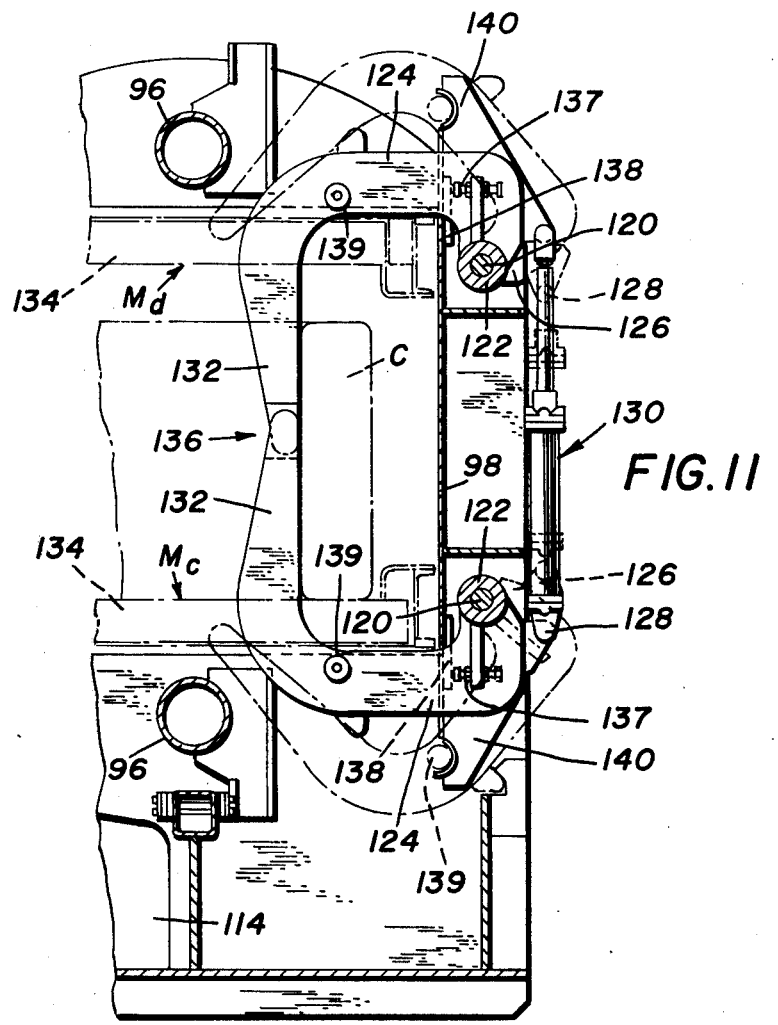

COIL INVERTER

BACKGROUND OF THE INVENTION

This invention relates generally to rolling mills and more particularly to an apparatus for inverting upstanding cylindrical product coils.

It is well known that both the front and tail ends of a coiled product length should preferably be trimmed and sampled in order to insure that the product is dimensionally and metallurgically satisfactory. In the past, this requirement has been satisfied by devices which transfer coils from one hook to another of a conventional hook carrier system, exposing first one end of the coil and then the other end to trimming operators. In other installations, the coils have been tranferred from forming mandrels to compacting mandrels which also expose both ends of the coil for trimming. These operations are, however, performed with the coil in a horizontal attitude and considerable physical manipulation and contact with coil surfaces are required.

An improved coil handling system has now been developed where the coils are maintained in an upstanding, i.e., vertical or near vertical condition while they are being transferred from one location to another. With upstanding coils, the tail end of the coiled product length is located at the top of the coil where it is readily accessible for trimming and sampling. However, the front end of the product length is at the bottom of the coil, thus making it necessary to invert the coil before front end sampling and trimming can be accomplished.

Accordingly, a general object of the present invention is the provision of a novel and improved apparatus for inverting upstanding cylindrical product coils.

Another object of the present invention is the provision of a coil inverter which operates without attendant distortion of a coil or damage to the surface of the coiled product.

SUMMARY OF THE INVENTION

According to the invention, there is provided a coil inverter for accepting and inverting coils for the purpose of gaining access to the lowermost rings comprising the front end of the rolled product length. One embodiment of the inverter is adapted to handle very large pallet-supported coils, while another embodiment is adapted to handle smaller product coils which because of their height/diameter ratio are relatively stable in transit and hence do not require special supporting pallets. Each embodiment accepts coils in an upstanding vertical or near vertical condition. Each embodiment further includes means for engaging the coil to prevent its distortion during inversion. Inversion is accomplished rapidly, and with an absolute minimum of sliding contact between the product rings and the coil engaging elements of the inverter. The inverted coils retain their upstanding cylindrical configuration without harmful distortion.

BRIEF DESCRIPTION OF THE DRAWINGS

Several embodiments of the invention will now be described by way of example only, with reference to the accompanying drawings, wherein:

FIG. 11 is a sectional view taken along lines 11—11 of FIG. 9.

DESCRIPTION OF PREFERRED EMBODIMENTS

Figure 1:
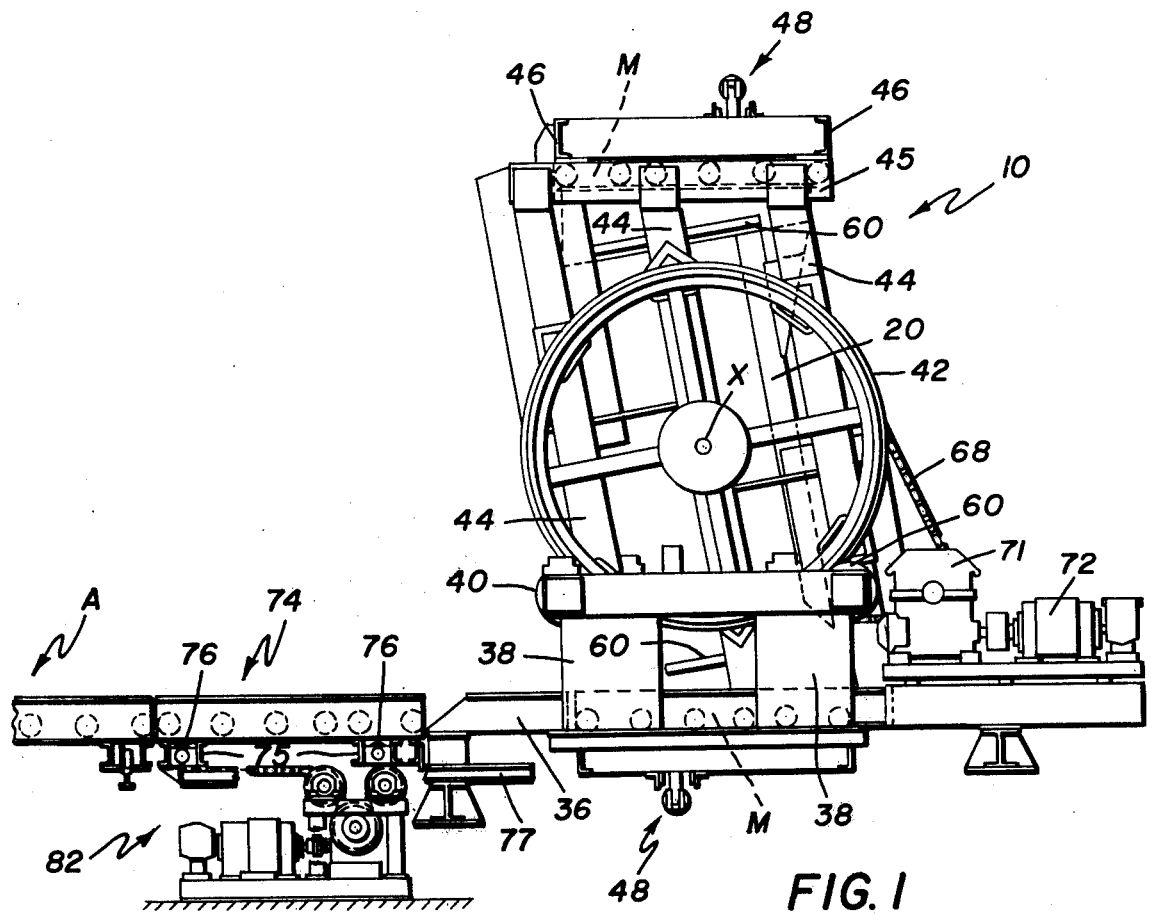
FIG. 1 is a view in side elevation of one embodiment of a coil inverter in accordance with the present invention.
Figure 2:
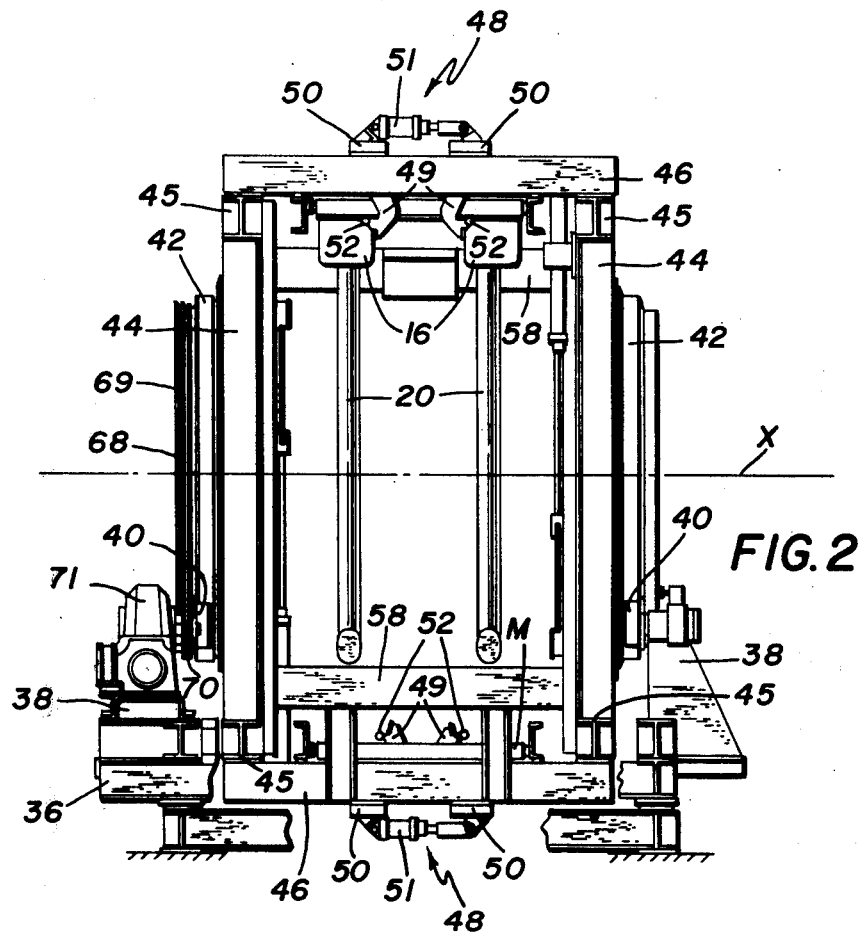
FIG. 2 is an end view of the inverter shown in FIG. 1.
Figure 3:
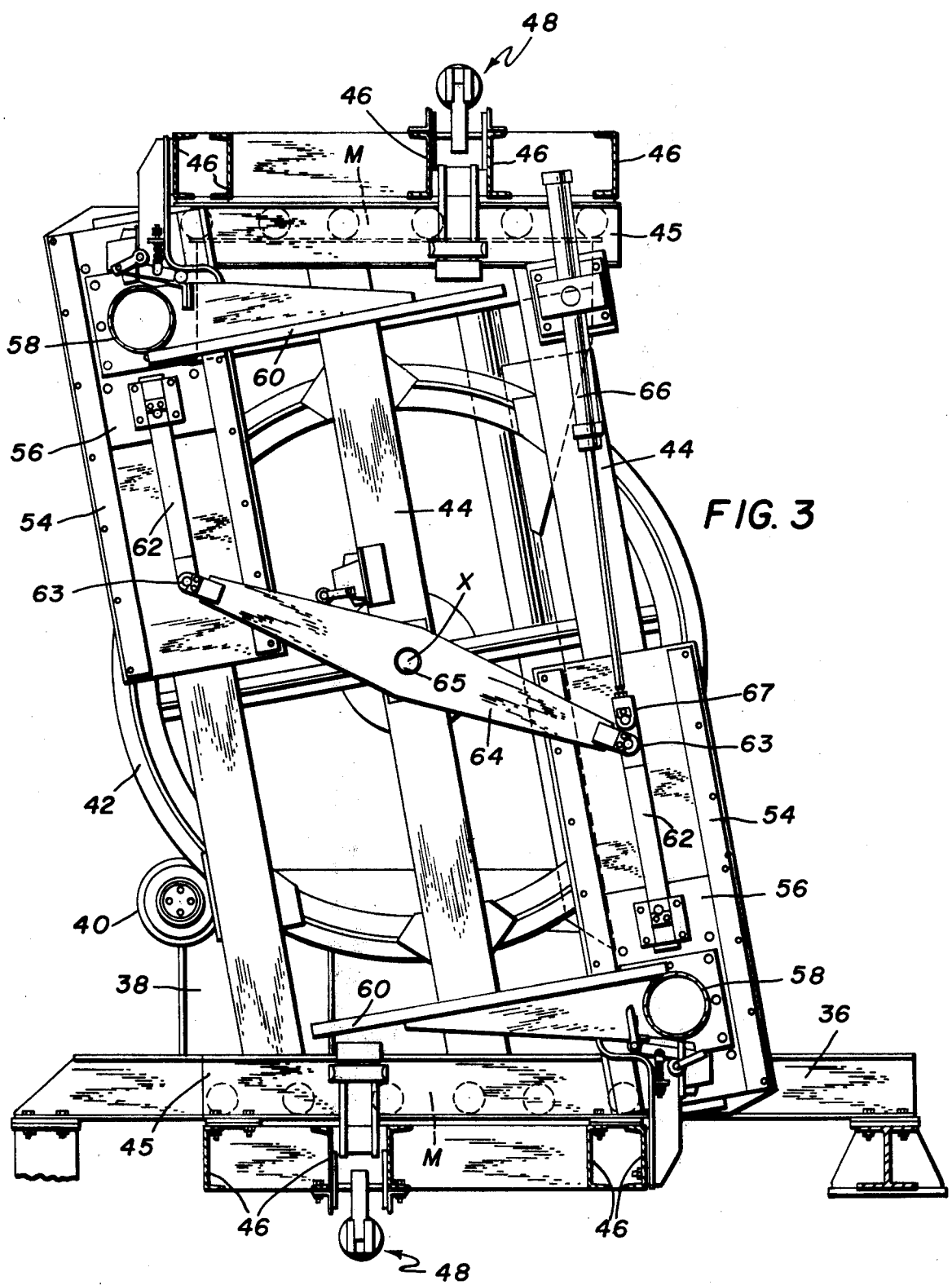
FIG. 3 is a sectional view on an enlarged scale taken along lines 3—3 of FIG. 2.
Figure 4:
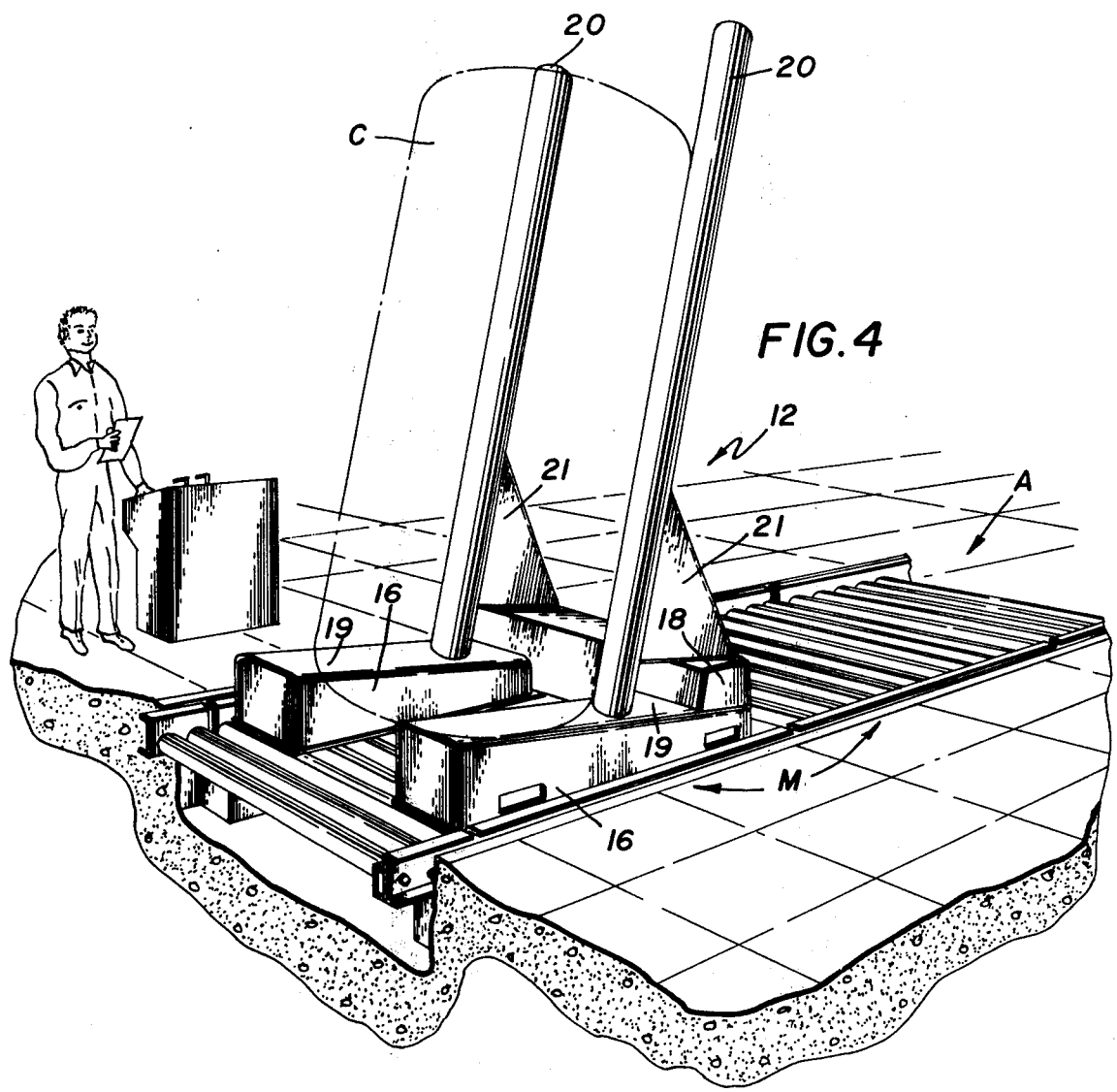
FIG. 4 is a perspective view showing a pallet-supported coil on a typical roller conveyor avenue.
Figure 5:
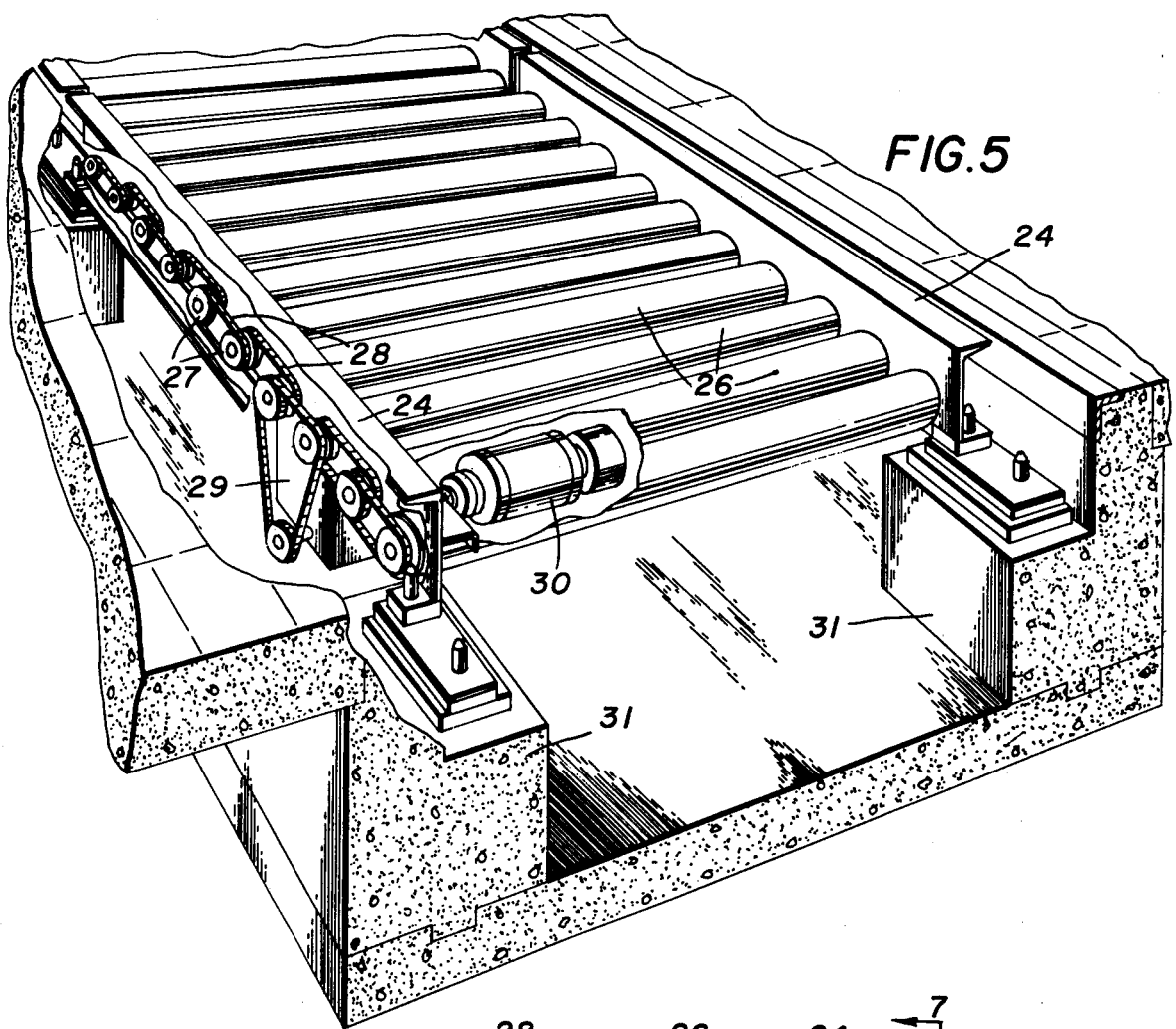
FIG. 5 is a perspective view from a different angle, with portions broken away, of the roller conveyor avenue shown in FIG. 4.
Figure 6:
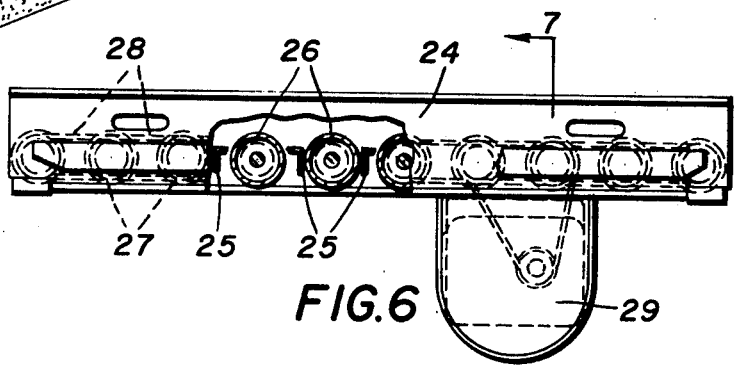
FIG. 6 is a side elevational view of one of the roller table modules shown in FIGS. 4 and 5.
Figure 7:
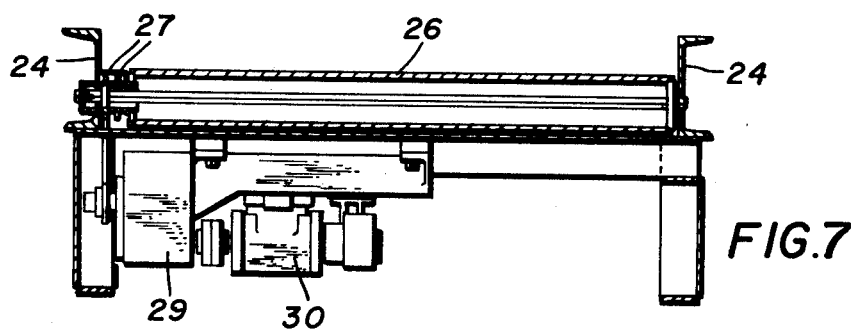
FIG. 7 is a sectional view taken along lines 7—7 of FIG. 6.

With reference initially to FIGS. 1–3, there is shown at 10 one embodiment of an inverter in accordance with the present invention. Inverter 10 is adapted to handle large upstanding product coils "C" (shown in FIG. 4) which are supported on specially designed pallets 12. The pallets are in turn adapted to be carried to and from the inverter by means of a coil handling system which includes a longitudinally extending roller conveyor avenue "A" made up of aligned, separate powered, self-contained and interchangeable roller table modules "M". The pallets, coil handling system and roller table modules are the subjects of separate applications assigned to the same assignee as that of the present invention, and hence they will only be described briefly here.

The pallets 12 are employed to impart stability to large upstanding coils C. Each pallet 12 is provided with a generally U-shaped base made up of laterally spaced leg members 16 inter-connected at their forward ends by a bridging member 18. The upper faces 19 of the leg members are inclined downward from front to rear. Support posts 20 extend vertically from the upper leg surfaces 19. The support posts braced by rearward brackets 21 which rest bridging member 18. When loaded on a pallet 12 C will have its bottom resting on the upper surface of the leg members 16. The coil will be inclined and will thus lean against the support posts 20. The coil will remain in a stable upstanding condition through its travel through the coil handling area. The near vertical attitude in which the coil is supported imparts a considerable measure of vertical coil developed by the weight of the coil itself. This feature is in marked contrast to the prevailing conditions which coils undergo while being transferred by the hooks of conventional hook carrier systems. The distance between the exterior sides of the leg members 16 is such that the pallet can readily move roller table modules M, with the side channels of the roller table modules acting as guides.

As previously indicated, the roller conveyor avenue A is made up of longitudinally aligned roller modules M. With reference additionally to FIG. it will be seen that the roller table modules M structures which are comprised basically of side channels 24 interconnected at appropriate locations by transverse angles 25. The side channels 24 support the ends of a plurality of laterally extending parallel table rollers 26. The table rollers have either sheaves or sprockets 27 at one end thereof which are interconnected by chains or belts 28. One or more of the rolls are additionally connected by means of appropriate sprockets or sheaves and a chain or belt to the output shaft of a gear reducer 29 which is in turn driven by a motor 30. The gear reducer and motor are located beneath the table rollers 26 and are bolted to a connecting plate extending between the side channels 24.

It will thus be seen that each module M is a self-contained unit which is adapted to be mounted at any desired location, for example on foundation pedestals 31 which are located in a channel extending longitudinally across the floor of the coil handling area. Substantially identical modules M may be included as parts of other coil handling equipment, as will hereinafter become more apparent.

The coil inverter 10 includes a base 36 having opposed pedestals 28 on which are mounted rollers 40. The rollers support opposed circular tracks 42 to which are attached side frames having vertical frame members 44 interconnected at their opposite ends by transverse braces 45. The braces 45 are in turn connected by cross members 46 on which are mounted roller table modules M in opposed relationship. Certain of the cross members 46 also carry pallet clamping mechanisms generally referred to by the reference numerals 48.

The pallet clamping mechanisms 48 include lever arms 49 pivotally mounted as at 50. The lever arms are interconnected by a piston-cylinder unit 51. The opposite ends of the lever arms terminate at noses 52 which are suitably adapted to enter into recesses (not shown) the inner surfaces of the leg members 16 of pallets wardly facing guide assemblies 54 (see FIG. 3) are mounted on the endmost vertical frame members 44. The guide assemblies contain slide members 56 which are interconnected by tubular cross-pieces 58. tubular cross-pieces in turn support opposed tongues 60. The slides 56 have arms 62 which are pivotally connected as at 63 to a central lever 64 which is pivotally mounted at its center as at 65 on the frame member 44. The lever 64 is operated by a linear actuator 66, the piston rod of which is connected to one of the arms 62 as at 67.

I thus be seen that the circular tracks 42, the members 44 and their respective interconnecting 45, 46 and the components attached to are there from a cradle assembly carried on the 0 for rotation about an axis x extending transverse relation to the longitudinal axis of the roller avenue A.

dle assembly is rotated about axis x by means 1 68 which extends around a circular chain mounted adjacent to one of the circular tracks ain is engaged by the drive sprocket 70 of a er 71 which is in turn powered by a motor ar generally indicated at 74 is located beoil inverter 10 and the end-most module M nveyor A. The feed car includes a roller e M mounted on cross braces 75 which 76 arranged to run along tracks 77. The feed car is moved in opposite directions along tracks 77 by means of a chain drive assembly generally indicated at 82.

Figure 8A:
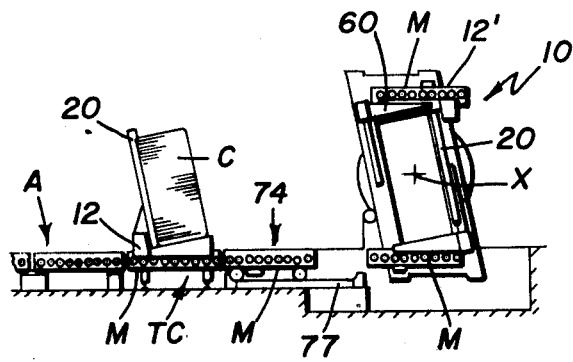
FIGS. 8A-8K are schematic illustrations showing the operation of the inverter embodiment depicted in FIGS. 1-3.
Figure 8B:
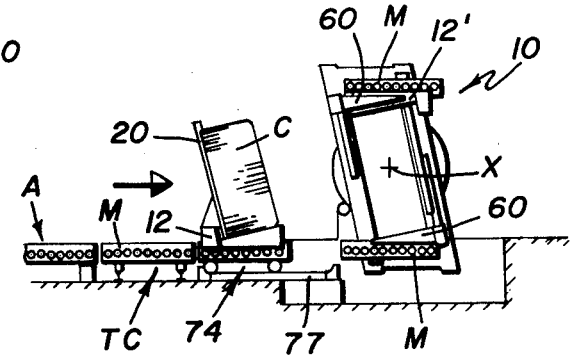
Figure 8C:
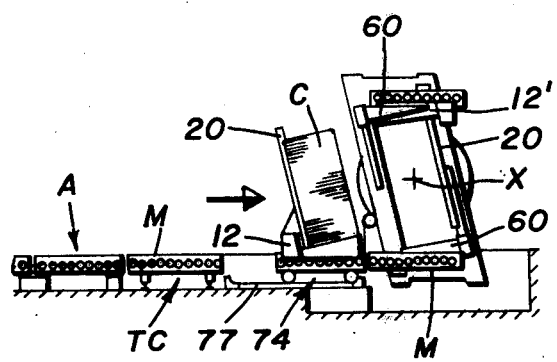
Figure 8D:
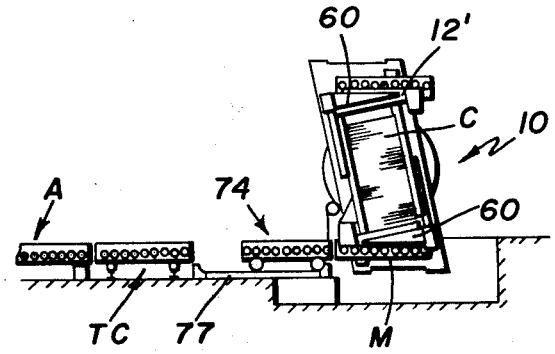
Figure 8E:
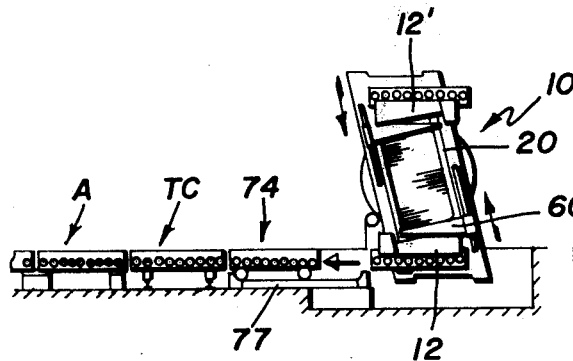
Figure 8F:
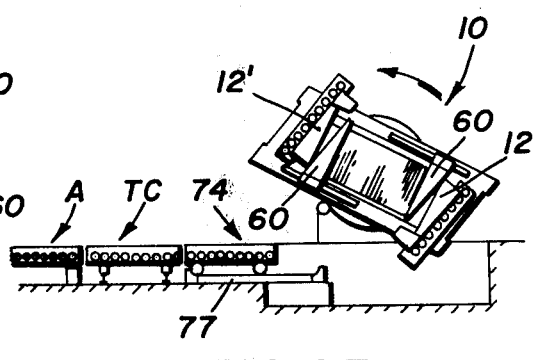
Figures 8G, 8H:
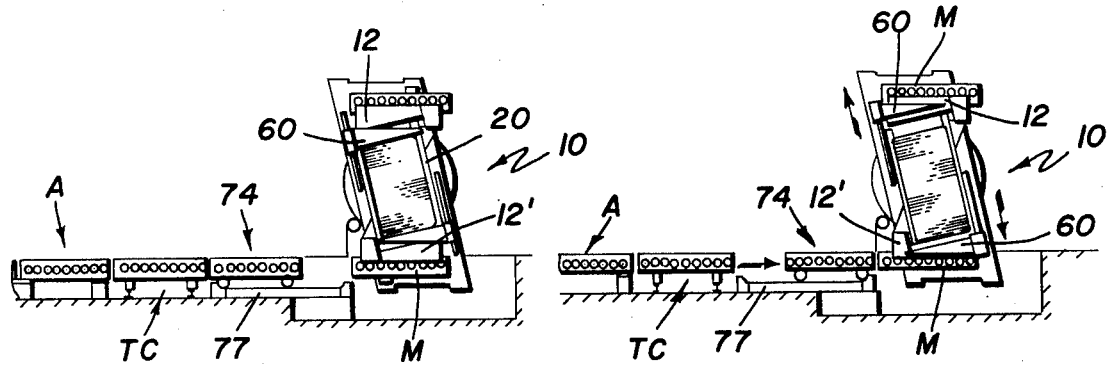
Figures 8I, 8J:
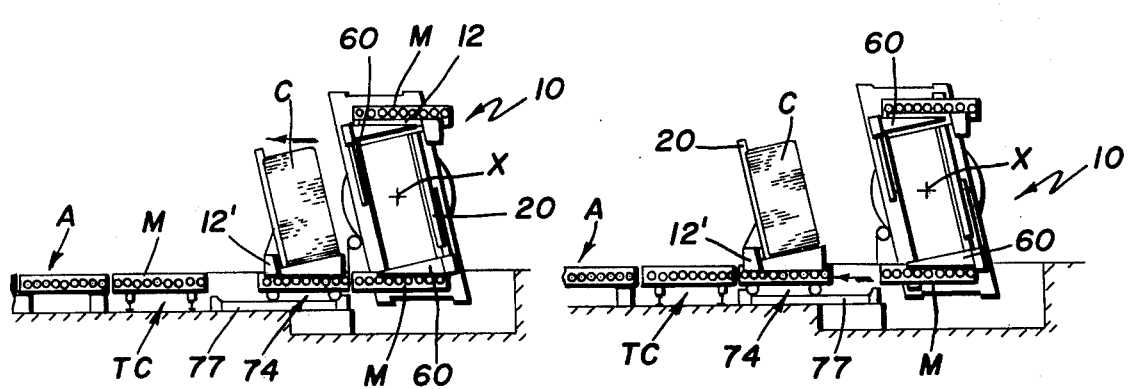
Figure 8K:
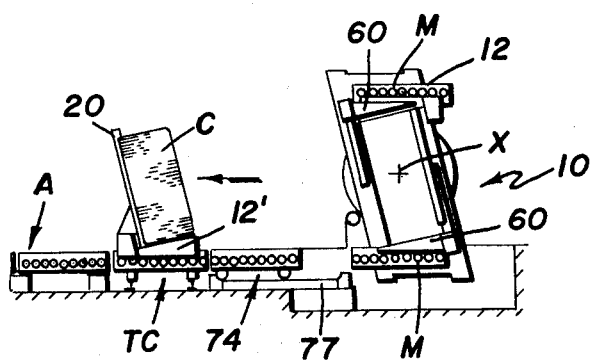

The operation of the coil inverter 10 will now be described with reference to schematic illustrations provided in 8A–8J. As shown in FIG. 8A, a pallet 12 with a coil C supported thereon has been delivered by a transfer car TC to a position in alignment with conveyor avenue A. At this location, the loaded pallet is directly adjacent to the feed car 74. An empty pallet 12′ is clamped in an inverted position within the coil inverter by one of the pallet clamping mechanisms 48. As shown in FIG. 8B the roller table modules of the transfer car mechanism TC and the feed car 74 are then energized to shift the loaded pallet onto roller table module of the feed car. Thereafter, as shown in FIG. 8C, the feed car is moved along the tracks 77 to a position directly adjacent to the coil inverter. Then, as shown in FIG. 8D, the roller table module of the feed car 74 and the lowermost module of the inverter are both energized to shift the loaded pallet into the inverter where the loaded pallet is clamped in position by the lowermost pallet clamping mechanism 48. This having been accomplished, and as shown in FIG. 8E, the linear actuators 66 are actuated to move the tongues 60 together to clamp the coil therebetween. This has the effect of raising the coil off of the lower pallet 12, while at the same time centering the center of gravity of the coil approximately at the turning axis x of the inverter. The coil is thus axially confined between the two tongues 60 and radially confined by the support posts of the two pallets 12, 12′. At this stage, the feed car 74 is also returned to its original position adjacent to the transfer car mechanism TC. Once this has been accomplished and as shown in FIG. 8F, the motor 72 is energized to rotate the inverter and the coil contained therein around the turning axis x through 180°. This results in an inversion of the coil as shown in FIG. 8F to a position shown in FIG. 8G. Thereafter, as shown in FIG. 8H, the tongues 60 are retracted and the feed car 74 is returned to a position adjacent to the inverter. Retraction of the tongues 60 causes the coil to be redeposited on the pallet 12′ which is in turn mounted on the lowermost roller table module M of the inverter. The lowermost pallet clamping mechanism 48 is then disengaged from pallet 12′ and the underlying roller table module of the inverter as well as the roller table module of the feed car are both energized to move the coil out of the inverter and back onto the feed car 74. Thereafter, as shown in FIG. 8J, the feed car is moved back along tracks 77 to a position adjacent to the transfer car TC. Finally, as shown in FIG. 8K, the roller table modules of the feed car and the transfer car are energized to move the loaded pallet 12′ onto the transfer car TC, thus completing the coil inversion process.

In light of the foregoing, it will now be appreciated by those skilled in the art that the inverter 10 provides a number of advantages which have heretofore been unavailable. Among these advantages is the ability to rapidly invert large pallet-supported coils without danger to operating personnel. During inversion, the coil is tightly confined, both centrally between opposed pallets, and radially by the support posts of the pallets. Consequently, the coil is not distorted, and the product rings are not scratched or marred.

Another embodiment of the invention which is generally indicated by the reference numeral 86 will now be described with further reference to FIGS. 9–11. As previously indicated, this embodiment is designed to handle smaller upstanding product coils which because of their height-diameter ratio, are more stable and thus capable of being handled vertically without specially designed separate support means. The inverter 86 is located along a roller conveyor avenue A' between aligned roller table modules $M_a$ and $M_b$. The inverter has a base 88 with opposed pedestals 90a, 90b carrying rollers 92a, 92b respectively at their upper ends. The rollers 92a, 92b are arranged to engage circular tracks 94a, 94b. The tracks are connected by a cradle assembly which includes tubular cross members 96 and side plates 98. Support members 100 extend between the side plates 98. The support members 100 carry roller table modules $M_c$ and $M_d$. The circular track 94a is grooved as at 102 to accept a drive chain 104 which has one end fixed to the track as at 106. The chain extends partially around the track groove 102, then down and around a drive sprocket 108, then back up into the groove 102 where its other end is fixed relative to the track as at 110. The drive sprocket 108 is mounted on the output shaft of a gear reducer 112 which is powered by a motor 114. Both the motor 114 and gear reducer 112 are conveniently mounted on the base 88. The motor 114 is reversible, and its operation in one direction or another will cause the inverter to rotate in either a clockwise or counterclockwise direction through 180° about a turning axis $x$ which is parallel to the length of conveyor avenue A'.

On one side of the inverter, there are provided side plates 116 carrying laterally spaced supports 118 between which extend short shafts 120 (see FIG. 11). Each shaft 120 has a sleeve 122 rotatably mounted thereon. The sleeves 122 are integral with hook-shaped members 124. The hook-shaped members 124 are further provided with laterally extending brackets 126 which are pivotally connected as at 128 to the opposite ends of a piston-cylinder assembly 130.

When the piston-cylinder assembly is in its axially contracted position as shown by the solid lines in the drawings, the arms 132 of the hook-shaped members 124 extend between the table rollers 134 of the modules $M_c$, $M_d$ and overlap each other as at 136. Extension of the piston-cylinder assembly 130 causes the hook-shaped members 124 to rotate about the shafts 120 to the open positions shown by the dot-dash lines in FIG. 11. When in the closed position, the hook-shaped members have adjustable stops 137 which engage fixed plates 138. When in the open position, the hook-shaped members 124 have pins 139 which engage fixed brackets 140.

The operation of the inverter 86 is as follows: the piston-cylinder unit 130 is operated to open the hook-shaped members 124 to the positions shown by the dot-dash lines in FIG. 11. Once this has been accomplished, an upstanding coil C is advanced laterally into the inverter. This is done by energizing the motors driving the roller table modules Ma and Mc. As soon as the coil has been received in the inverter, the piston-cylinder unit 130 is extended to close the hook-shaped members 124. This places the overlapping arms 132 in the eye of the coil, as shown in FIG. 11. Thereafter, motor 114 is energized to rotate the inverter about axis $x$ through 180° in a counterclockwise direction. This results in the coil C being inverted and redeposited on roller table module $M_d$. During inversion, the overlapping arms 132 support the coil and assist in maintaining its cylindrical shape. After inversion, the piston-cylinder unit 130 is again actuated to open the hook-shaped members 124, after which the roller table modules $M_d$ and $M_b$ are energized to move the coil out of the inverter and further along the avenue A'. The inverter is then ready to accept the next coil.

In light of the foregoing description, the advantages made possible by the present invention will now be appreciated by those skilled in the art. With regard to the embodiment illustrated in FIG. 1–8, there is provided an inverter an inverter 10 adapted to handle large coils supported in an upstanding slightly inclined position on specially designed pallets. The inverter 10 operates to invert these large coils in an efficient manner while maintaining the cylindrical coil shape and with an absolute minimum of frictional contact with the product rings. Inversion can be accomplished automatically without the need for constant supervision by operating personnel.

Figure 9:
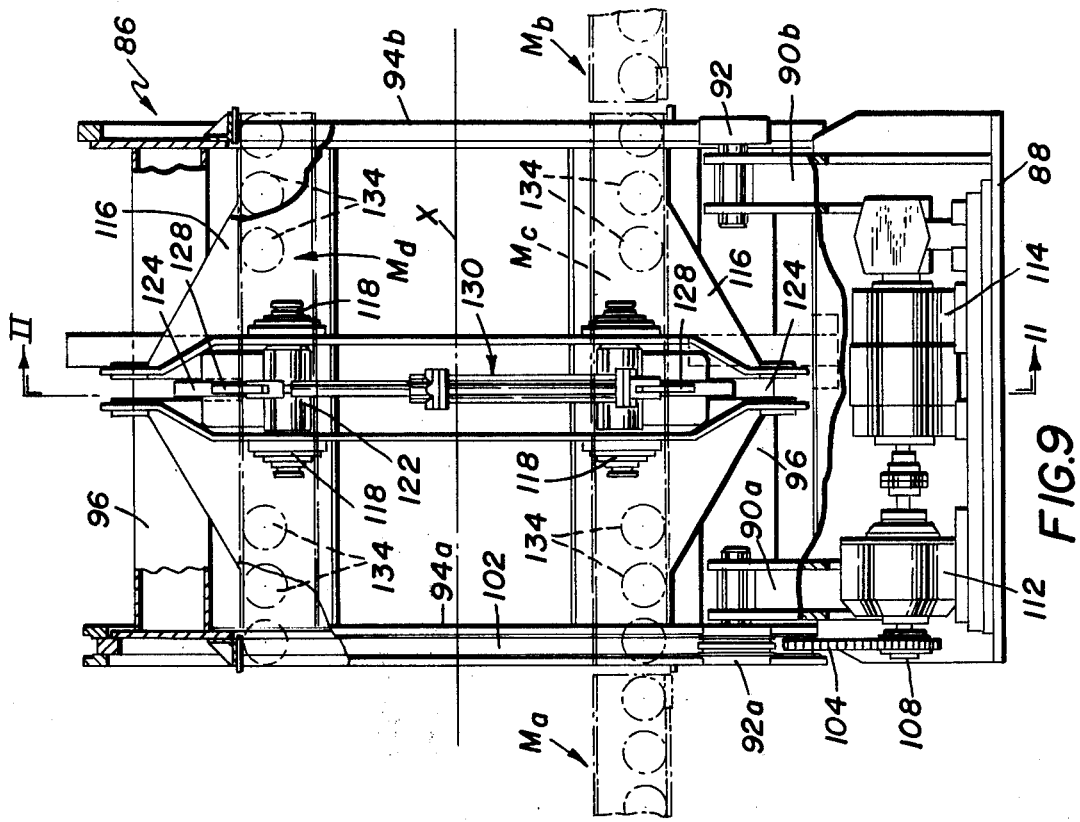
FIG. 9 is a side elevational view of an alternate embodiment of an inverter in accordance with the present invention.
Figure 10:
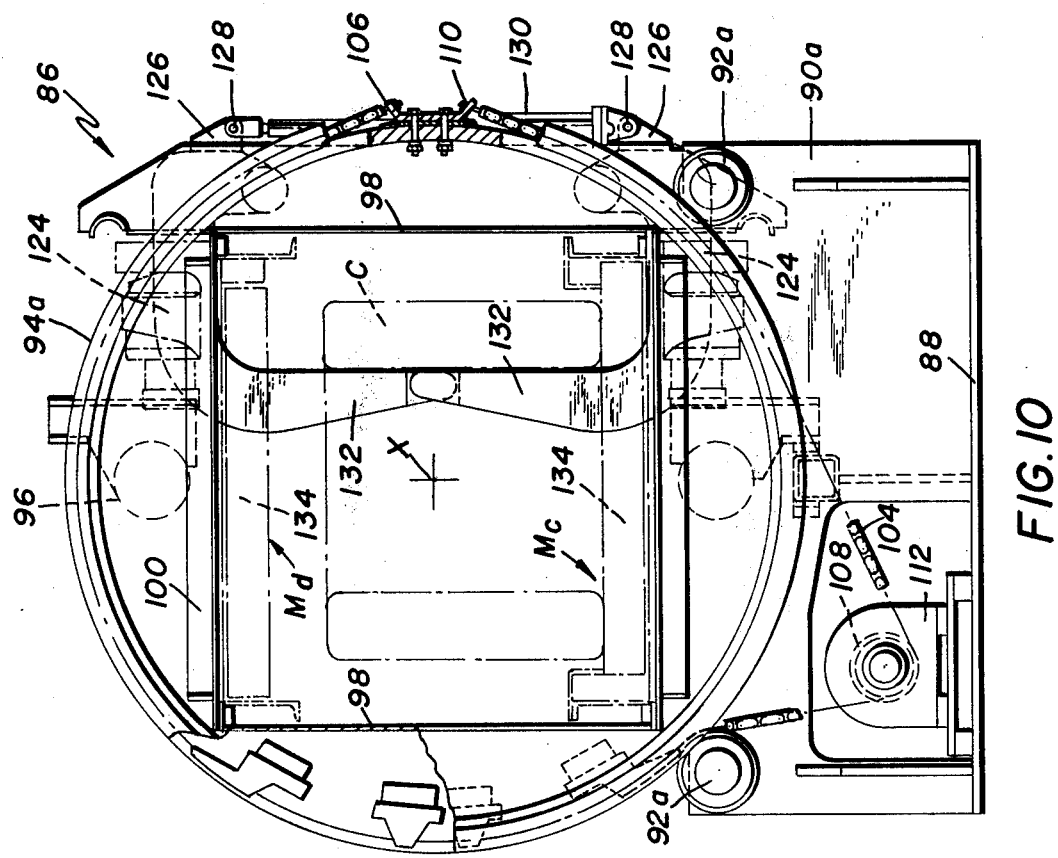
FIG. 10 is an end view of the inverter shown in FIG. 9.

The embodiment shown in FIG. 9–11 is adapted to handle smaller coils which are more stable and hence do not require specially designed pallets.

It is our intention to cover all changes and modifications of the embodiments herein chosen for purposes of disclosure which do not depart from the spirit and scope of the invention.

We claim:

1. Apparatus for inverting a cylindrical coil, comprising: a stationary housing; a cradle mounted on said housing for rotation about a turning axis, said cradle having opposed roller table modules on opposite sides of said turning axis; first and second pallets, each having a generally U-shaped base with upstanding support members against which a coil is inclined when carried on the pallet base; clamping means for clamping said first pallet with a coil carried thereon to one of said roller table modules and for clamping said second pallet to the other of said roller table modules, the coil thus being confined radially by the support members of both said first and second pallets; holding means on said cradle for axially confining the coil; and, means for rotating said cradle about said turning axis to invert the coil, whereupon when said holding means is released, the coil will be received on said second pallet.

2. The apparatus as claimed in claim 1 wherein said holding means is comprised of opposed tongue members arranged at the said opposite sides of said turning axis, the said tongue members being movable towards and away from each other between an open position permitting a coil and its supporting first pallet to be received on one of said roller table modules, and a closed position contacting the ends of the coil, at which closed position the coil is confined axially between the tongue members with the coil ends being out of contact with the bases of both said first and second pallets.

3. The apparatus as claimed in claim 2 wherein said tongue members are mounted on slide members interconnected by a linkage arrangement which includes a central lever mounted on said cradle for pivotal movement about said turning axis.

4. The apparatus as claimed in claim 3 wherein said holding means further includes a piston-cylinder assembly operatively connected between said cradle and one of said slide members.

5. The apparatus as claimed in claim 2 wherein said U-shaped pallet bases have laterally spaced legs, and wherein said tongue members are adapted to move towards and away from each other between said legs.

* * * * *